United States Patent
Pincenti

(10) Patent No.: US 10,602,079 B2
(45) Date of Patent: Mar. 24, 2020

(54) DIGITAL IMAGE COLOR SPACE CHANNEL BLENDING

(71) Applicant: Motorola Mobility LLC, Chicago, IL (US)

(72) Inventor: John Christopher Pincenti, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 26 days.

(21) Appl. No.: 15/879,178

(22) Filed: Jan. 24, 2018

(65) Prior Publication Data

US 2019/0230295 A1 Jul. 25, 2019

(51) Int. Cl.
*H04N 5/265* (2006.01)
*G06T 5/20* (2006.01)
*G06T 11/00* (2006.01)
*H04N 5/232* (2006.01)

(52) U.S. Cl.
CPC ............... *H04N 5/265* (2013.01); *G06T 5/20* (2013.01); *G06T 11/001* (2013.01); *H04N 5/23238* (2013.01)

(58) Field of Classification Search
CPC ...... H04N 5/265; H04N 5/23238; G06T 5/20; G06T 11/001
See application file for complete search history.

(56) References Cited

U.S. PATENT DOCUMENTS

| | | | |
|---|---|---|---|
| 9,838,614 B1* | 12/2017 | Brailovskiy | H04N 5/247 |
| 2013/0222414 A1* | 8/2013 | Ito | G09G 5/02 |
| | | | 345/600 |
| 2014/0362173 A1* | 12/2014 | Doepke | H04N 5/23238 |
| | | | 348/36 |
| 2016/0182818 A1* | 6/2016 | Morioka | H04N 5/23238 |
| | | | 348/222.1 |
| 2016/0292837 A1* | 10/2016 | Lakemond | G06T 5/002 |
| 2018/0035047 A1* | 2/2018 | Lei | H04N 5/23238 |
| 2018/0082454 A1* | 3/2018 | Sahu | H04N 5/23238 |

OTHER PUBLICATIONS

Levin,"Seamless Image Stitching in the Gradient Domain", Proceedings of the European Conference on Computer Vision, May 2004, pp. 377-389.
Zomet,"Seamless Image Stitching by Minimizing False Edges", IEEE D Transactions on Image Processing vol. 15, No. 4, Apr. 2006, 969-977., Apr. 2006, 8 pages.

* cited by examiner

*Primary Examiner* — Jason A Flohre
(74) *Attorney, Agent, or Firm* — SBMC

(57) ABSTRACT

In aspects of digital image color space channel blending, a camera device can capture digital images that encompass a three-hundred and sixty degree (360°) field of view. An image blending module is implemented to combine the digital images along a seam between the digital images to form a blended image. To combine the digital images, the image blending module can determine mismatched color between the digital images along the seam within an overlap region that overlaps two of the digital images along the seam. The image blending module can then blend the digital images by channel gains in a color space applied to enhance pixels of one of the digital images starting within the overlap region along the seam and blending into the one digital image.

20 Claims, 5 Drawing Sheets
(3 of 5 Drawing Sheet(s) Filed in Color)

DIGITAL IMAGE COLOR SPACE CHANNEL BLENDING

BACKGROUND

Digital images can be captured with a three-hundred and sixty degree field of view (360° FOV) camera and then stitched together to form a combined 360-degree field of view image by image processing techniques that combine the captured digital images. A 360-degree FOV camera can be two cameras in a back-to-back configuration, with each camera having a one-hundred and eighty degree (180°) field of view to capture approximately half of the overall 360-degree field of view image. When the two captured images from the two cameras are stitched together to form the 360-degree field of view image, there can be a noticeable seam between where the images are joined, such as caused by differences in the color and/or intensity response of the two cameras, by non-exact lens shading correction between the two cameras, or by image flare from direct or reflected lighting that affects one of the captured images and not the other. This noticeable seam between the two captured images in the combined 360-degree field of view image is an objectionable and unwanted artifact in the combined image.

Conventional image processing solutions to remove the appearance of a seam between captured images are overly complicated and processing intensive solutions, and tend to introduce blurring and unwanted image artifacts in the resulting image. For example, an averaging technique and an alpha-blending technique introduce blurring in the resulting image along the seam, and can introduce unwanted image artifacts in the resulting image. Other processing intensive solutions include Poisson blending, solving Poisson equations to blend the images, and a pyramid blending solution that creates image pyramids, using Gaussian or Laplacian transforms to blend the images using masked pyramid weights. Notably, these blending solutions are ineffective for images that have color and intensity differences along a seam at their boundaries, and can also introduce the blurring and unwanted image artifacts in the resulting image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Aspects of digital image color space channel blending are described with reference to the following Figures. The same numbers may be used throughout to reference similar features and components that are shown in the Figures.

DETAILED DESCRIPTION

Figure 1:
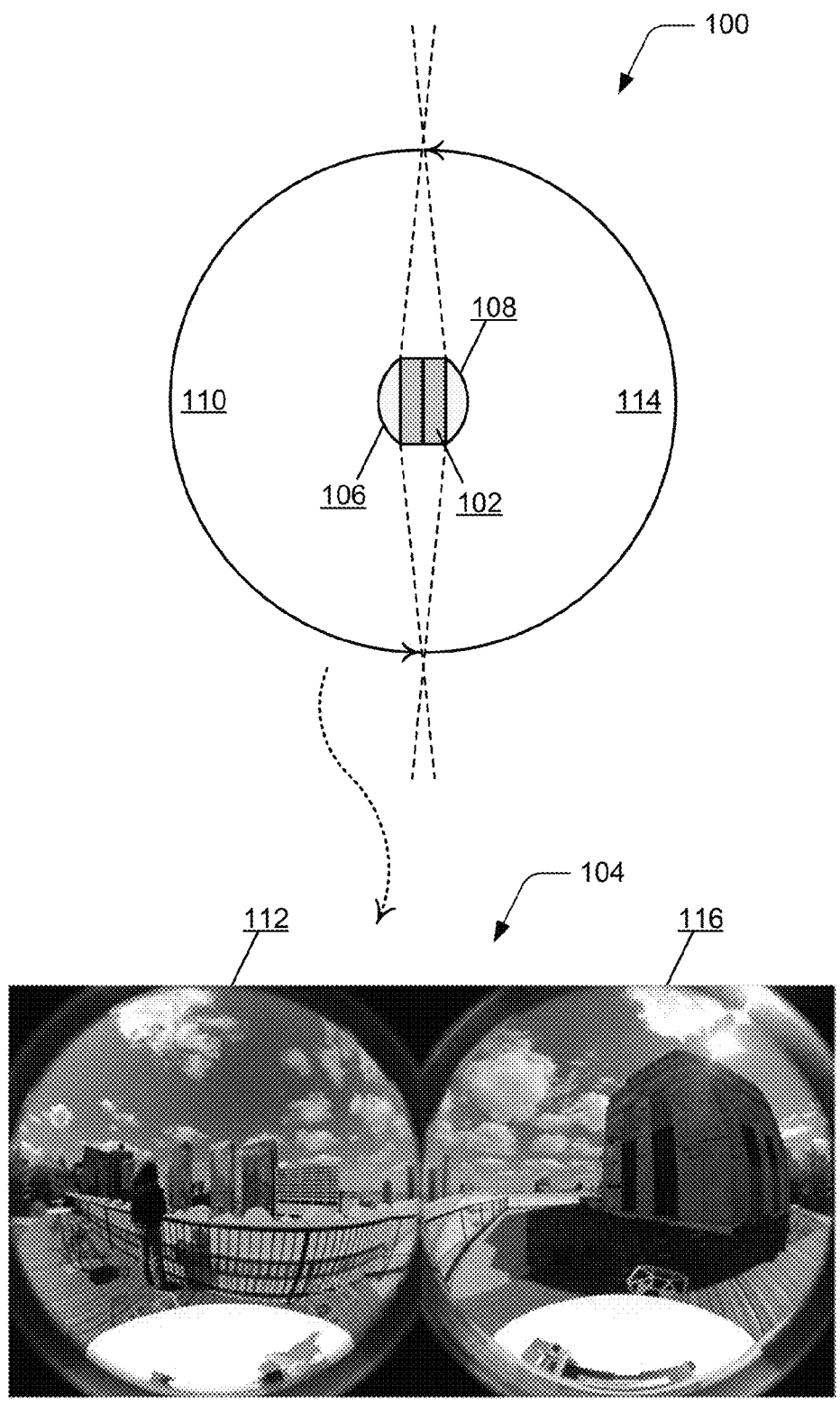
FIG. 1 illustrates an example implementation of a 360-degree camera in aspects of digital image color space channel blending.

Digital image color space channel blending is described, and may be implemented by a mobile device that includes a three-hundred and sixty degree field of view (360° FOV) camera, such as a mobile phone, camera device, wearable device, or any other type of portable device that includes the 360-degree camera. Digital images can be captured with the 360-degree camera and then stitched together to form a combined 360-degree field of view image by image processing techniques that combine the captured digital images, such as left and right digital images. Generally, the features of digital image color space channel blending are described with reference to a 360-degree field of view image formed from two 180-degree digital images that are the left digital image and the right digital image of the combined image. However, the features described herein can be utilized for any number of digital images that may be combined to form a larger field of view image. Notably, the features described herein may also be utilized for other image blending applications, and not just as part of a 360-degree camera application.

In aspects of digital image color space channel blending, an image blending module is implemented to determine mismatched color along the seam between digital images that are combined to form a combined image. As noted above, a combined 360-degree field of view image may have a noticeable seam between where the digital images are joined to form the combined image, such as from pixels with color and intensity differences between the digital images, and this noticeable seam is an objectionable and unwanted artifact in the combined image.

The image blending module can blend the digital images of the combined image by applying channel gains in a color space to enhance pixels of one of the digital images. This effectively removes the appearance of the seam artifact from the combined image, generating a blended image in which the seam artifact does not appear. Generally, the image blending module can be implemented for real-time operation to blend digital images using color space channel gains without introducing blurring artifacts or degrading texture and image content of the combined image, thereby generating the blended image in which the seam artifact does not appear. In implementations, the image blending module can determine the mismatched color along the seam in the combined image, and blend the digital images in YCbCr color space, which is also commonly referred to as the YUV color space. In the YCbCr color space, "Y" is the luminance (intensity) component of digital image color, and "Cb" and "Cr" are the chroma channels, where "Cb" is the blue color difference and "Cr" is the red color difference of the digital image color. Alternatively, the image blending module can blend the digital images in the RGB (Red, Green, Blue) color space, or utilize any number of other color representations, such as the HSL and HSV cylindrical-coordinate representations, or the L*a*b color space. Each color space typically includes three channels, such as in the RGB color space where each channel represents one of the specific red, green, and blue colors. In the YCbCr color space, the "Y" channel represents intensity, whereas the "Cb" and "Cr" channels contain color information.

The image blending module is implemented to determine mismatched color between the left and right sides of a combined 360-degree field of view image along the seam within an overlap region that overlaps the two sides of the combined image along the seam. With reference to a left and right perspective, the overlap region is generally a vertical region that overlaps the left and right digital images forming the respective left and right sides of the combined image along the seam, and the overlap region can correspond to overlapping image content that is captured in both of the digital images. The vertical region is then x-number of pixels wide on each side of the seam between the left and right digital images, and the vertical region extends from the top of the combined image to the bottom of the combined image vertically along the seam.

In other implementations, the overlap region that encompasses the seam between two digital images may generally be a horizontal region that overlaps top and bottom digital images forming respective top and bottom halves of a combined image along the seam. Notably, the overlap region may be aligned as a vertical region, horizontal region, or in any other region configuration encompassing the seam between digital images that are blended to form a combined image. Additionally, in the event that an overlap region is not accessible or discernable by the image blending module and/or by other image processing, then the region of the left and right digital images immediately adjacent to each other along the seam, but not necessarily overlapping, can be used by the image blending module to blend the images that make up the combined image.

To determine the mismatched color between the left and right sides of a combined image along the seam in a vertical orientation between left and right digital images, the image blending module is implemented to determine average values of the channel gains in the color space for regions-of-interest within the vertical region for each of the left and right digital images (e.g., each side of the combined image). The regions-of-interest horizontally subdivide the vertical region and each region-of-interest encompasses pixels of the digital images on each side of the seam. In implementations, a region-of-interest can encompass one or more horizontal pixel rows within the vertical region, and the average values of the channel gains are determined on each side of the seam in each of the regions-of-interest going down the vertical region.

The image blending module can include a low-pass filter that is applied to filter the average values of the channel gains, generating filtered average values of the channel gains effective to minimize introducing artifacts into a combined 360-degree field of view image when the image is blended. The image blending module is implemented to blend the two sides of the combined image by applying the filtered average values of the channel gains to enhance the pixels of one of the digital images that make up the combined image. For example, the image blending module can blend the digital images by applying the filtered average values of the channel gains to enhance the pixels of the left side of the combined image starting within the vertical region along the seam and blending into the one digital image.

The color blending extends beyond the vertical region into the left side of the combined image to match the color and intensity of the right side of the combined image. Generally, the blending extends horizontally to enhance the pixels of the image and tapers off as the blending progresses into the image. Notably, the image blending module alters or enhances the color, tone, and/or intensity of the pixels of the image to channel blend the images without altering image content, texture, and sharpness, and without introducing ghosting artifacts.

While features and concepts of digital image color space channel blending can be implemented in any number of different devices, systems, environments, and/or configurations, aspects of digital image color space channel blending are described in the context of the following example devices, systems, and methods.

FIG. 1 illustrates an example implementation 100 of a 360-degree camera 102 in aspects of digital image color space channel blending. The 360-degree camera 102 is generally representative of multiple cameras that can capture digital images 104 over an entire three-hundred and sixty degree (360°) field of view. The multiple cameras of the 360-degree camera each have a smaller field of view, and the captured digital images 104 can be combined to form a single image (also referred to as a combined image). In this example, the 360-degree camera 102 includes two camera devices 106, 108 in a back-to-back configuration, each having a one-hundred and eighty degree (180°+) field of view.

As orientated in the illustration, the left camera device 106 has a field of view 110 of one-hundred and eighty degrees (180°+) and can capture the digital image 112 (e.g., the left image). The right camera device 108 has a field of view 114 of one-hundred and eighty degrees (180°+) and can capture the digital image 116 (e.g., the right image). As illustrated, the digital images 104 are distorted or warped when captured by the camera devices 106, 108 due to the wide field of view of each camera. By image processing techniques, the captured digital images 104 can then be de-warped and stitched together to form a combined 360-degree field of view image that combines the left digital image 112 and the right digital image 116. An example is shown and described with reference to FIG. 2.

Although only the two camera devices 106, 108 are shown in this example implementation 100, the 360-degree camera 102 may include any number of camera devices that each capture a digital image with a smaller field of view, and the captured digital images can then be stitched together by image processing techniques to form a combined 360-degree field of view image. For example, the 360-degree camera 102 may be implemented with four camera devices, each having a ninety degree (90°+) field of view, and the four captured digital images can then be combined for a three-hundred and sixty degree (360°) field of view in a single image. As noted above, the features described herein for digital image color space channel blending can be utilized for any number of digital images that may be combined to form a larger field of view image. Further, the features may also be utilized for other image blending applications, and not just as part of a 360-degree camera application.

Figure 2:
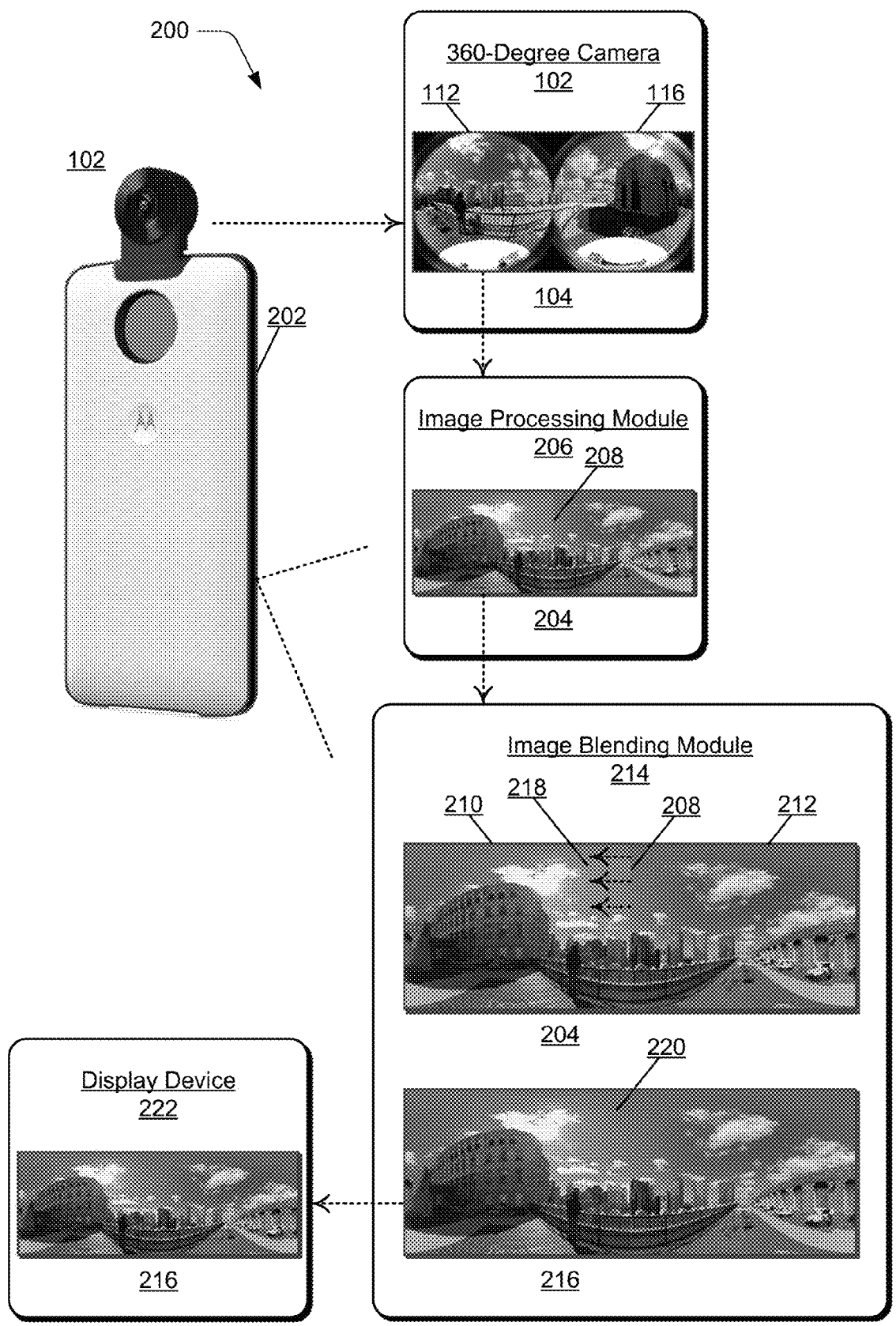
FIG. 2 illustrates an example system for digital image color space channel blending in accordance with one or more implementations described herein.

FIG. 2 illustrates an example system 200 in which aspects of digital image color space channel blending can be implemented. The example system 200 includes a mobile device 202, such as a mobile phone, tablet device, camera device, wearable device, or any other type of portable electronic and/or computing device. The mobile device 202 includes the 360-degree camera 102, either as an integrated component of the mobile device 202 or as an attachment that operates with the mobile device. Alternatively, the 360-degree camera 102 may be an independent, stand-alone device that is wirelessly connected to the mobile device 202. Generally, the mobile device 202 is any type of an electronic and/or computing device implemented with various components, such as a processing system and memory, as well as any number and combination of different components as further described with reference to the example device shown in FIG. 5. For example, the mobile device 202 can include a power source to power the device, and can also include an integrated display device that is used to display the captured digital images.

As described above, the 360-degree camera 102 captures the digital images 104 with two camera devices, each having a one-hundred and eighty degree (180°+) field of view. The captured digital images 104 can then be de-warped and stitched together to form a combined 360-degree field of view image 204 by image processing techniques that combine the left and right digital images. In this example system 200, the mobile device 202 includes an image processing module 206 that is implemented to de-warp and stitch together the left digital image 112 as captured by the left camera device 106 and the right digital image 116 as captured by the right camera device 108 to form the combined 360-degree field of view image 204. Notably, the digital images 104 are already aligned horizontally given that the digital images 112, 116 are captured by the respective camera devices 106, 108, which themselves are designed to be aligned in the 360-degree camera 102. Alternatively, the image processing of the captured digital images 104 by the image processing module 206 may also include aligning the digital images horizontally.

As can be seen in this example, the combined 360-degree field of view image 204 has a visually noticeable seam 208 running vertically between the left side 210 of the combined image 204 and the right side 212 of the combined image where the two digital images 112, 116 have been stitched together. This visually noticeable seam 208 is an objectionable and unwanted artifact in the combined 360-degree field of view image 204, and in this example, results from pixels with color and intensity differences between the two digital images. As used herein, the left digital image 112 is the left side 210 of the combined image 204 and the right digital image 116 is the right side 212 of the combined image 204, and the respective terms are used interchangeably to describe aspects of digital image color space channel blending with reference to the combined image 204.

The mobile device 202 also includes an image blending module 214 that implements aspects of digital image color space channel blending as described herein. Although shown and described as separate modules of the mobile device 202, the image blending module 214 may be integrated or implemented together with the image processing module 206. Generally, the image blending module 214 and/or the image processing module 206 may include independent processing, memory, and logic components functioning with the mobile device 202. Alternatively or in addition, the image blending module 214 and/or the image processing module 206 can be implemented as a software application or software module, such as computer-executable software instructions that are executable with a processor or processing system of the mobile device 202.

In this example system 200, the image blending module 214 receives the digital images 112, 116 as input from the 360-degree camera 102, or receives the combined 360-degree field of view image 204 as input from the image processing module 206. The image blending module 214 can then determine mismatched color between the left side 210 of the combined image and the right side 212 of the combined image along the seam 208. The image blending module 214 can then blend the two sides of the combined image by applying channel gains in a color space to enhance pixels of one of the digital images, which effectively removes the appearance of the seam artifact. For example, the left and right digital images 112, 116 are blended by the image blending module 214 to generate a blended image 216 by applying the channel gains in a color space at 218 to enhance the pixels of the left side 210 of the combined image 204 starting along the seam 208 and blending into the digital image as shown at 218.

As can be seen in the example, the seam artifact does not appear in the blended image 216, and the pixels in an example region 220 of the image are enhanced and appear having similar color, tone, and/or intensity as the pixels on the right side 212 of the blended image. Features and specifics of digital image color space channel blending in the combined 360-degree field of view image 204 by the image blending module 214 are further shown and described with reference to FIG. 3. As noted above, the blended image 216 can be displayed on a display device 222, such as a display device that is an integrated component of the mobile device 202, or a display device that is an external, peripheral component.

Figure 3:
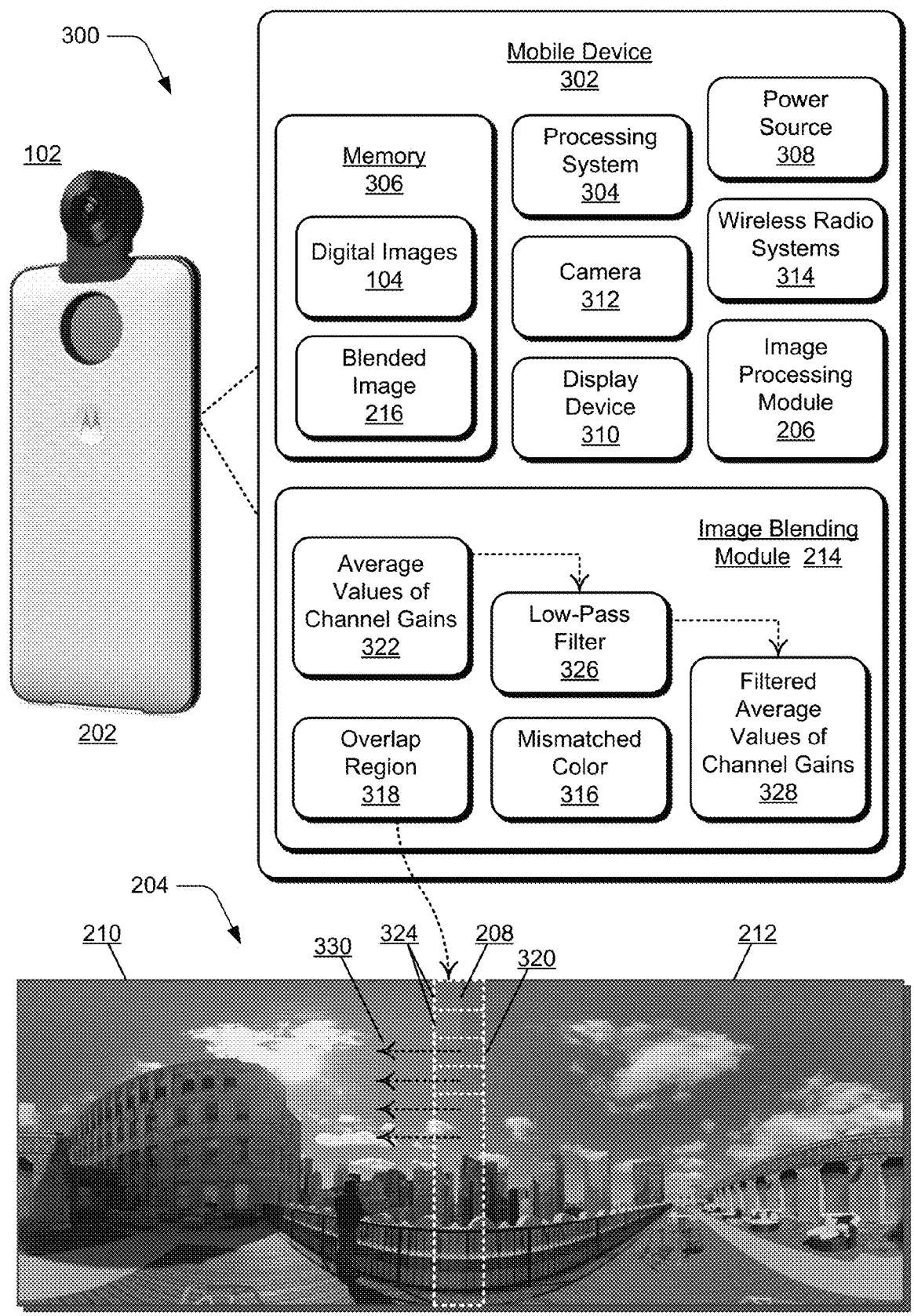
FIG. 3 illustrates an example system for digital image color space channel blending in accordance with one or more implementations described herein.

FIG. 3 illustrates an example system 300 in which aspects of digital image color space channel blending can be implemented. The example system 300 includes any type of a mobile device 302, such as a mobile phone, tablet device, camera device, wearable device, or any other type of portable electronic and/or computing device that includes the 360-degree camera 102, either as an integrated component of the mobile device 302 or as an attachment that operates with the mobile device. The mobile device 202, such as a mobile phone as shown and described with reference to FIG. 2, is an example implementation of the mobile device 302. Generally, the mobile device 302 is any type of an electronic and/or computing device implemented with various components, such as a processing system 304 and memory 306, as well as any number and combination of different components as further described with reference to the example device shown in FIG. 5. For example, the mobile device 302 can include a power source 308 to power the device, such as a rechargeable battery and/or any other type of active or passive power source that may be implemented in an electronic and/or computing device. The mobile device 302 can also include an integrated display device 310, as well as an integrated camera 312 (e.g., in addition to the 360-degree camera 102).

The mobile device 302 can include various, different wireless radio systems 314, such as for Wi-Fi, Bluetooth™, Mobile Broadband, LTE, Near Field Communication (NFC), Real-time Locating System (RTLS), or any other wireless radio system or format for communication via respective wireless networks. Generally, the mobile device 302 implements the wireless radio systems 314 that each include a radio device, antenna, and chipset implemented for cellular, wireless, and/or other network communication with other devices, networks, and services. A wireless radio system 314 can be configured to implement any suitable communication protocol or standard.

The mobile device 302 also includes the image processing module 206, as well as the image blending module 214 that implements features of digital image color space channel blending, as described herein. The image blending module 214 may include independent processing, memory, and logic components functioning as a computing and/or electronic device integrated with the mobile device 302. Alternatively or in addition, the image blending module 214 can be implemented as a software application or software module, such as computer-executable software instructions that are executable with a processor (e.g., with the processing system 304). As a software application, the image blending module 214 can be stored on computer-readable storage memory (e.g., the memory 306), or with any suitable memory device or electronic data storage implemented with the correlation module.

As described with reference to FIG. 2, the image blending module 214 receives the captured digital images 104 as input from the 360-degree camera 102, or receives the combined 360-degree field of view image 204 as first de-warped and stitched together by the image processing module 206. The image blending module 214 is implemented to determine mismatched color 316 between the left side 210 of the combined image 204 and the right side 212 of the combined image along the seam 208 within an overlap region 318, shown as a vertical region 320 in the combined image 204, that overlaps the two sides of the combined image along the seam. As noted above, the left digital image 112 is the left side 210 of the combined image 204 and the right digital image 116 is the right side 212 of the combined image 204, and the respective terms are used interchangeably to describe the left and right sides of the combined image 204.

The vertical region 320 that overlaps the two digital images 112, 116 forming the respective left and right sides 210, 212 of the combined image 204 along the seam 208 can correspond to overlapping image content that is captured in both of the digital images 112, 116. In this described example, the overlapping vertical region 320 is sixteen pixels wide on each side of the seam 208 between the digital images 112, 116, and the vertical region extends from the top of the combined image 204 to the bottom of the combined image vertically along the seam 208. As noted above, the overlap region that encompasses the seam between two digital images may generally be a horizontal region that overlaps top and bottom digital images forming respective top and bottom halves of a combined image along the seam. Notably, the overlap region may be aligned as a vertical region, horizontal region, or in any other region configuration encompassing the seam between digital images that are blended to form a combined image. As noted above, the overlap region may not be accessible by the image blending module 214, in which case the features of digital image color space channel blending as described herein can be applied to blend the region of the digital images 112, 116 immediately adjacent to each other along the seam to blend the images that make up the combined image 204.

To determine the mismatched color 316 between the left side 210 of the combined image 204 and the right side 212 of the combined image along the seam 208, the image blending module 214 is implemented to determine average values 322 of the channel gains in regions-of-interest 324 within the vertical region 320 for each of the digital images 112, 116 (e.g., each side of the combined image 204). As shown in the illustration, the regions-of-interest 324 horizontally subdivide the vertical region 320 and each region-of-interest 324 encompasses pixels of the digital images 112, 116 on each side of the seam 208. In implementations, a region-of-interest 324 can encompass one or more horizontal pixel rows within the vertical region 320. For example, a region-of-interest 324 may encompass the sixteen pixels wide by sixteen pixels vertically on each side of the seam 208 that is between the digital images 112, 116. The average values 322 of the channel gains in the color space are determined on each side of the seam 208 in each of the regions-of-interest 324 going down the vertical region 320.

In implementations, the regions-of-interest 324 may be dynamically adaptive by the image blending module 214, which adapts the x-number of pixel rows on the horizontal within the vertical region 320 based on combined image results and/or based on variances in the digital images colors and intensity along the seam 208 between the two digital images. For a larger degree of color variance between the digital images 112, 116 within the vertical region 320 along the seam 208, the corresponding regions-of-interest 324 may be smaller, and vice-versa for a smaller degree of color variance between the digital images within the vertical region 320 along the seam 208.

In aspects of digital image color space channel blending, the image blending module 214 is implemented to determine the average values 322 of the channel gains in YCbCr color space (also commonly referred to as the YUV color space) of the captured digital images 104. In the YCbCr color space, "Y" is the luminance (intensity) component of the digital image color, and "Cb" and "Cr" are the chroma channels, where "Cb" is the blue color difference and "Cr" is the red color difference of the digital image color. Alternatively, the image blending module 214 is implemented to determine the average values 322 of the channel gains in RGB (Red, Green, Blue) color space. Generally, the average values 322 in YCbCr color space and/or in the RGB color space are referred to as the "calculated channel gains" used to blend one of the two sides of the combined image 204.

The channel gains can be calculated either by a multiplier value or by addition, which could be positive or negative value. For the RGB color space, a multiplier value is used, but the channel gains can also be determined using an addition for RGB. For the YCbCr color space, a multiplier can be used to determine the channel gain for the "Y" component, but can also be determined using an addition. For the chroma channels gain corresponding to the "Cb" and "Cr" components, an addition is used by the image blending module 124, but a multiplier could be used. In the described implementations using the YCbCr color space, the "Y", "Cb", and "Cr" components are all determined by the image blending module 124 utilizing an addition, which may be a positive of negative value channel gain.

The image blending module 214 is implemented to determine the average values 322 of the channel gains of the digital images 112, 116 in the YCbCr color space (or the multipliers in the RGB color space) for each of the regions-of-interest 324 (e.g., the x-number of pixel rows) down the vertical region 320 along the seam 208 between the images. In implementations, each of the "Y", "Cb", and "Cr" channels are calculated separately, and the "Y" channel is blended independently from the CbCr channels.

The image blending module 214 includes a low-pass filter 326 that is applied to filter the average values 322 of the channel gains, generating filtered average values 328 of the channel gains effective to minimize introducing artifacts into the combined image 204 when the image is blended. In implementations, the low-pass filter 326 is implemented as a box filter that is a computationally efficient low-pass filter, however other types of filters may also be implemented to filter the determined color differences. The effect of the low-pass filter 326 is to eliminate erratic gain variations or image noise that can adversely affect the color and intensity differences, and the subsequent blending. The image blending module 214 is implemented to blend the two sides of the combined image 204 by applying the filtered average values 328 of the channel gains to enhance the pixels of one of the digital images 112, 116 that make up the combined image. For example, the image blending module 214 blends the digital images by applying the filtered average values 328 of the channel gains to enhance the pixels of one of the digital images 112 (e.g., the left side 210 of the combined image 204) starting within the vertical region 320 along the seam 208 and blending into the one digital image 112 that is the left side 210 of the combined image 204 as shown at 330.

Notably, the color blending extends beyond the vertical region 320 into the left side 210 of the combined image 204 to match the color and intensity of the right side 212 of the combined image 204. Generally, the blending (e.g., channel blending) may extend horizontally at 330 to enhance the pixels of the image and taper off into the image, such as at approximately twenty percent (20%), twenty-five percent (25%), or into any other region of the image. In this implementation, the channel gains between the two sides of the combined image 204 would be zero (0) if the color and intensity of the two digital images 112, 116 match, given calculated channel gains using an addition or subtraction value in the YCbCr color space. However, for mismatched color and intensity, the channel gains between the two images could be higher, lower, or any other representation of the mismatched color between the digital images. In an implementation using the RGB color space, the channel gains between the two sides of the combined image 204 would be one (1) if the color and intensity of the two digital images 112, 116 match, given calculated channel gains using a multiplication or division value in the RGB color space.

Accordingly, the blending (e.g., channel blending) may be applied to enhance the pixels of the image starting at a higher gain value along the seam 208 and, as the blending progresses into the image at 330, gradually tapering down to the channel gain value of zero (0) in the described YCbCr color space implementation. Alternatively, the blending may be applied to enhance the pixels starting at a lower gain value along the seam 208 and, as the blending progresses into the image at 330, gradually tapering up to the channel gain value of zero (0). Notably, the image blending module 214 alters or enhances the color, tone, and/or intensity of the pixels of the image to blend the images without altering image content, texture, and sharpness, and without introducing ghosting artifacts.

In an aspect of digital image color space channel blending, the image blending module 214 can also be implemented to adaptively taper the blending into the one digital image 112 (e.g., the left side 210 of the combined image 204) based on a change in image content as the blending progresses at 330 into the image. For example, the blending of the blue sky into the digital image 112 (e.g., the left side 210 of the combined image) can smoothly and gradually taper to the channel gain value of zero (0) in the described YCbCr color space implementation. However, if the image content quickly transitions from blue sky to a building, for example, the pixel change is immediate and the progressive taper is dynamically adapted to taper off and stop much quicker so as not to corrupt the overall appearance of the image by blending the blue sky color into the color of the building image content.

Example method 400 is described with reference to FIG. 4 in accordance with implementations of digital image color space channel blending. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
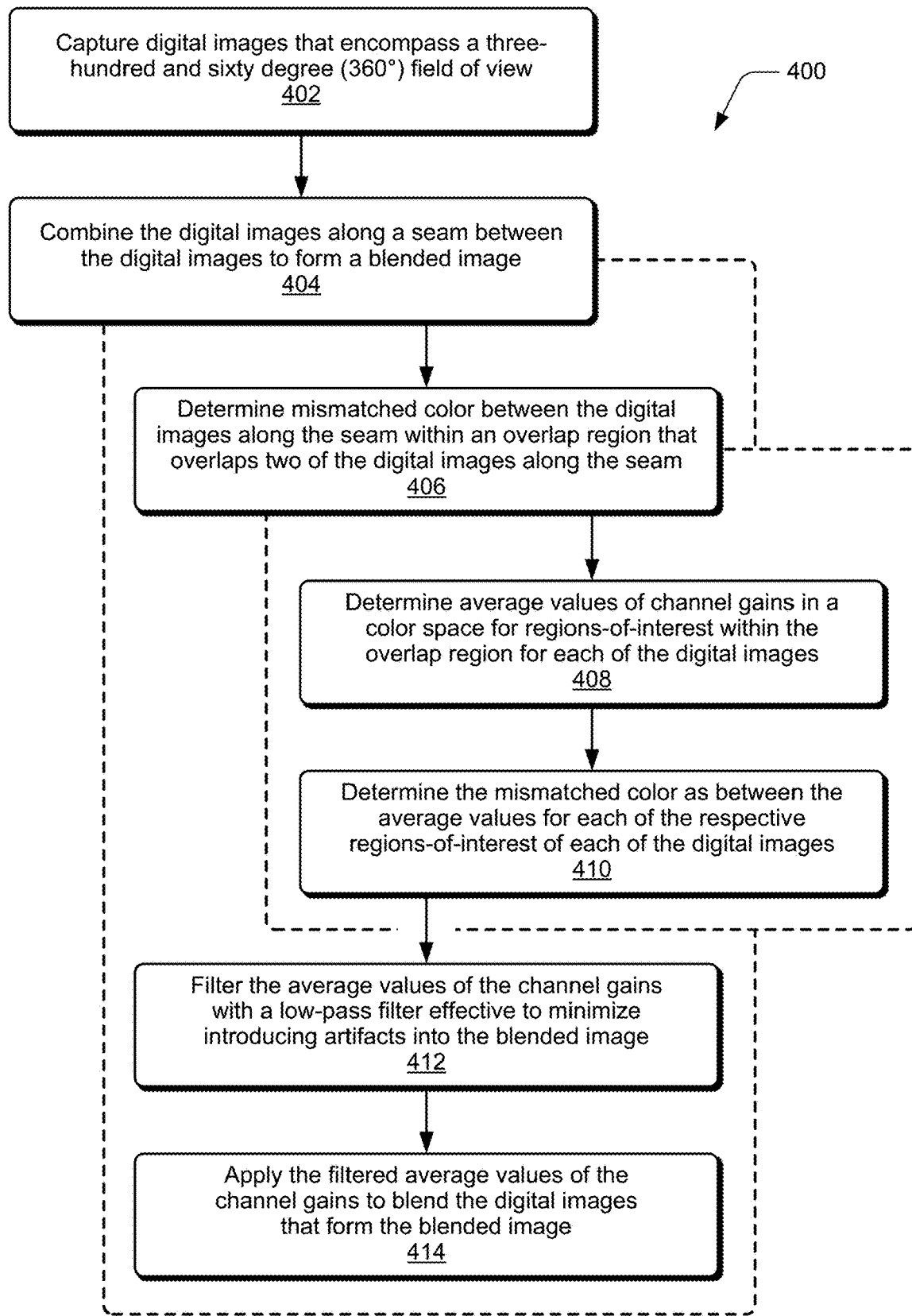
FIG. 4 illustrates an example method of digital image color space channel blending in accordance with one or more implementations described herein.

FIG. 4 illustrates example method(s) 400 of digital image color space channel blending as described herein. The order in which the method is described is not intended to be construed as a limitation, and any number or combination of the described method operations can be performed in any order to perform a method, or an alternate method.

At 402, digital images are captured that encompass a three-hundred and sixty degree (360°) field of view. For example, the 360-degree camera 102 of the mobile device 202 captures the digital images 104 that encompass a three-hundred and sixty degree (360°) field of view. The 360-degree camera 102 includes two camera devices 106, 108 in a back-to-back configuration, each having a one-hundred and eighty degree (180°+) field of view. As shown orientated in FIG. 1, the left camera device 106 has a field of view 110 of one-hundred and eighty degrees (180°+) and captures the digital image 112 (e.g., the left image). The right camera device 108 has a field of view 114 of one-hundred and eighty degrees (180°+) and captures the digital image 116 (e.g., the right image).

At 404, the digital images are combined along a seam between the digital images to form a blended image. For example, the image blending module 214 of the mobile device 202 and/or the image processing module 206 combines the left digital image 112 as captured by the left camera device 106 and the right digital image 116 as captured by the right camera device 108 to form the combined 360-degree field of view image 204. Notably, the digital images 104 are already aligned horizontally given that the digital images 112, 116 are captured by the respective camera devices 106, 108, which themselves are designed to be aligned in the 360-degree camera 102. Alternatively, the image processing of the captured digital images 104 by the image processing module 206 may also include aligning the digital images horizontally.

As illustrated in FIG. 4, combining the digital images 112, 116 along the seam 208 to form the blended image 216 (at 404) includes the features of determining the mismatched color 316 between the digital images 112, 116 (at 406), filtering the average values 322 of the channel gains (at 412), and applying the filtered average values 328 of the channel gains to blend the digital images (at 414). Further, determining the mismatched color 316 between the digital images 112, 116 (at 406) includes the features of determining the average values 322 of the channel gains in the color space for the regions-of-interest 324 within the vertical region 320 for each of the digital images (at 408), and determining the mismatched color 316 as between the average values 322 for each of the respective regions-of-interest 324 of each of the digital images (at 410). These features are further described in more detail below, continuing the description of the method 400.

At 406, mismatched color between the digital images is determined along the seam within an overlap region that overlaps two of the digital images along the seam. For example, the image blending module 214 determines the mismatched color 316 between the left side 210 of the combined image 204 and the right side 212 of the combined image along the seam 208 within the vertical region 320 (e.g., an overlap region) that overlaps the two sides of the combined image along the seam. In implementations, the vertical region 320 that overlaps the two digital images 112, 116 forming the respective left and right sides 210, 212 of the combined image 204 along the seam 208 may correspond to overlapping image content that is captured in both of the digital images 112, 116. Additionally, the overlapping vertical region 320 can be sixteen pixels wide on each side of the seam 208 between the digital images 112, 116, and the vertical region extends from the top of the combined image 204 to the bottom of the combined image vertically along the seam 208.

At 408, average values of the channel gains in the color space for regions-of-interest are determined within the overlap region for each of the digital images, and at 410, the mismatched color is determined as between the average values for each of the respective regions-of-interest of each of the digital images. For example, the image blending module 214 is implemented to determine the average values 322 of the channel gains in the color space for the regions-of-interest 324 within the vertical region 320 for each of the digital images 112, 116 (e.g., each side of the combined image 204). As shown in the example illustrated in FIG. 3, the regions-of-interest 324 horizontally subdivide the vertical region 320 and each region-of-interest 324 encompasses pixels of the digital images 112, 116 on each side of the seam 208. The average values 322 of the channel gains in the color space are determined on each side of the seam 208 in each of the regions-of-interest 324 going down the vertical region 320. Further, the image blending module 214 determines the average values 322 of the channel gains in the YCbCr color space of the captured digital images 104.

At 412, the average values 322 of the channel gains are filtered with a low-pass filter effective to minimize introducing artifacts into the blended image. For example, the image blending module 214 implements the low-pass filter 326, which is designed to filter the average values 322 of the channel gains, generating the filtered average values 328 of the channel gains effective to minimize introducing artifacts into the combined image 204 when the image is blended. In implementations, the low-pass filter 326 can be implemented as any type of filter that eliminates erratic gain variations or image noise, which can adversely affect the color differences, such as a box filter that is a computationally efficient low-pass filter.

At 414, the filtered average values 328 of the channel gains are applied to blend the digital images that form the blended image. For example, the image blending module 214 blends the two sides of the combined image 204 by applying the filtered average values 328 of the channel gains to enhance the pixels of one of the digital images 112, 116 that make up the combined image. The image blending module 214 blends the digital images by applying the filtered average values 328 of the channel gains to enhance the pixels of one of the digital images 112 (e.g., the left side 210 of the combined image 204) starting within the vertical region 320 (e.g., the overlap region) along the seam 208 and blending into the one digital image 112 at 330. The image blending module 214 can also adaptively taper the blending into the one digital image 112 (e.g., the left side 210 of the combined image 204) based on a change in image content as the blending progresses into the image at 330.

Figure 5:
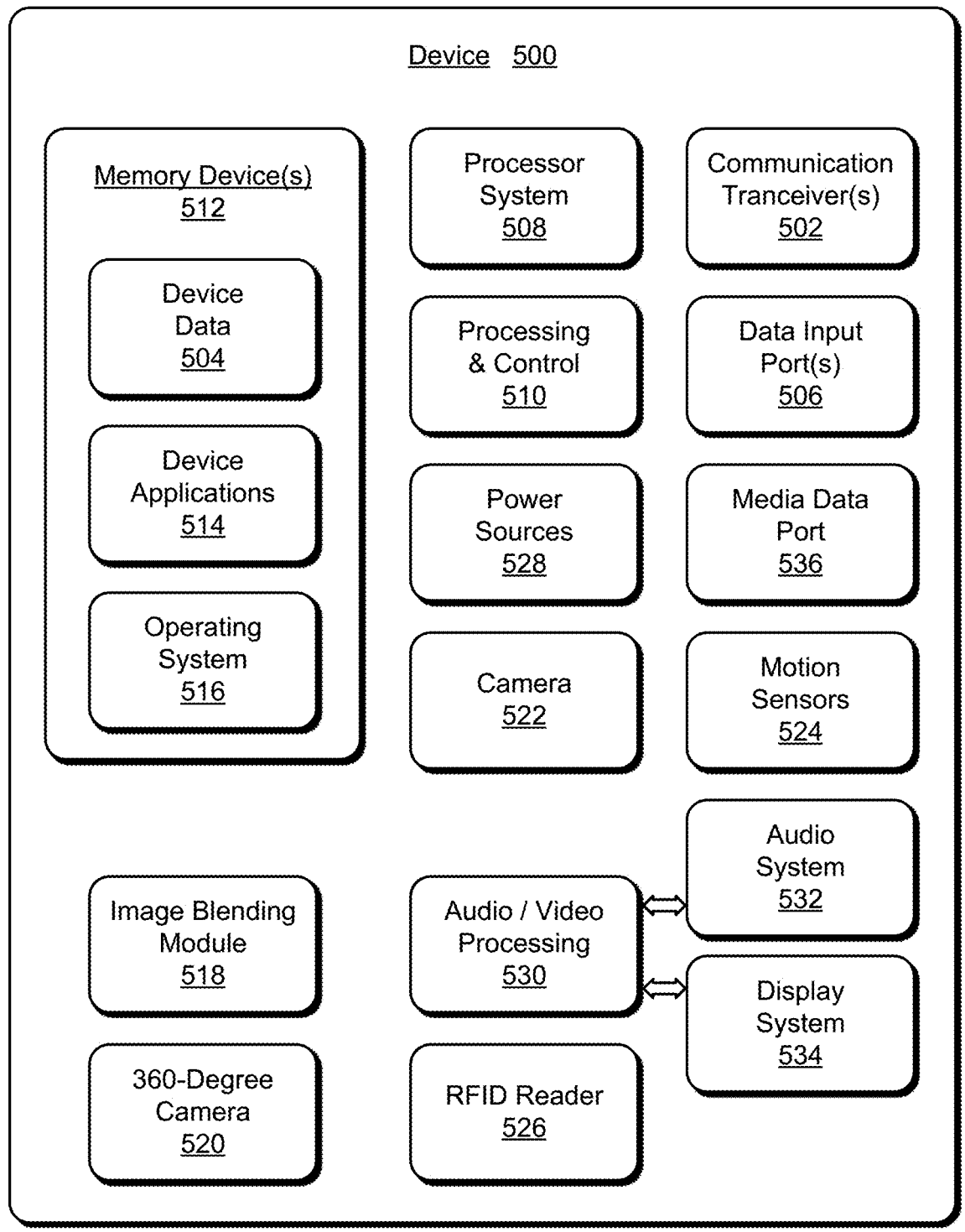
FIG. 5 illustrates various components of an example device that can implement aspects of digital image color space channel blending.

FIG. 5 illustrates various components of an example device 500 in which aspects of digital image color space channel blending can be implemented. The example device 500 can be implemented as any of the devices described with reference to the previous FIGS. 1-4, such as any type of mobile device, mobile phone, client device, wearable device, tablet, computing, communication, entertainment, gaming, media playback, and/or other type of electronic device. For example, the mobile device 202 (e.g., a mobile phone) and the mobile device 302 shown and described with reference to FIGS. 1-4 may be implemented as the example device 500. Further, a wearable device may include any one or combination of a watch, armband, wristband, bracelet, glove or pair of gloves, glasses, jewelry items, clothing items, any type of footwear or headwear, and/or other types of wearables.

The device 500 includes communication transceivers 502 that enable wired and/or wireless communication of device data 504 with other devices. The device data 504 can include any of the captured digital images, combined image, image color processing data, and other digital image processing data. Additionally, the device data 504 can include any type of audio, video, and/or image data. Example communication transceivers 502 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processor system 508 of one or more processors (e.g., any of microprocessors, controllers, and the like) and/or a processor and memory system implemented as a system-on-chip (SoC) that processes computer-executable instructions. The processor system 508 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device 500 can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 (e.g., memory devices) that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on.

In this example, the device 500 includes an image blending module 518 that implements aspects of digital image color space channel blending, and may be implemented with hardware components and/or in software as one of the device applications 514, such as when the device 500 is implemented as the mobile device 202 or the mobile device 302 described with reference to FIGS. 1-4. An example of the image blending module 518 is the image blending module 214 that is implemented as a software application and/or as hardware components in the mobile phone 202 or in the mobile device 302. In implementations, the image blending module 518 may include independent processing, memory, and logic components as a computing and/or electronic device integrated with the device 500.

In this example, the example device 500 includes a 360-degree camera 520, either as an integrated component or as an attachment to the device. The device 500 also includes an integrated camera 522 and motion sensors 524, such as may be implemented in an inertial measurement unit (IMU). The motion sensors 524 can be implemented with various sensors, such as a gyroscope, an accelerometer, and/or other types of motion sensors to sense motion of the device. The various motion sensors 524 may also be implemented as components of an inertial measurement unit in the device.

The device 500 can also include a radio-frequency identification (RFID) reader 526 as an integrated component or as an attachment to the device, and the RFID reader is implemented to interrogate RFID tags for identifying data and receive identification responses from the RFID tags. The device 500 can also include one or more power sources 528, such as when the device is implemented as a mobile device. The power sources may include a charging and/or power system, and can be implemented as a flexible strip battery, a rechargeable battery, a charged super-capacitor, and/or any other type of active or passive power source.

The device 500 also includes an audio and/or video processing system 530 that generates audio data for an audio system 532 and/or generates display data for a display system 534. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 536. In implementations, the audio system and/or the display system are integrated components of the example device. Alternatively, the audio system and/or the display system are external, peripheral components to the example device.

Although implementations of digital image color space channel blending have been described in language specific to features and/or methods, the subject of the appended claims is not necessarily limited to the specific features or methods described. Rather, the features and methods are disclosed as example implementations of digital image color space channel blending, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following: A method comprising: capturing digital images that encompass a three-hundred and sixty degree (360°) field of view; combining the digital images along a seam between the digital images to form a blended image, the combining comprising: determining mismatched color between the digital images along the seam within an overlap region that overlaps two of the digital images along the seam; and applying channel gains in a color space to blend the digital images, the channel gains applied to enhance pixels of one of the digital images starting within the overlap region along the seam and blending into the one digital image.

Alternatively or in addition to the above described method, any one or combination of: determining the mismatched color between the digital images along the seam comprises: determining average values of the channel gains in the color space for pixel rows within the overlap region for each of the digital images; and determining the mismatched color as between the average values for each of the respective pixel rows of each of the digital images. Further comprising filtering the average values of the channel gains with a low-pass filter effective to minimize introducing artifacts into the blended image. The average values of the channel gains are determined in YCbCr color space of the digital images. Applying the channel gains in the color space to blend the digital images comprises tapering the blending from a difference value starting along the seam and diminishing the difference value as the blending progresses into the one digital image. Tapering the blending into the one digital image is adaptive based on a change in image content as the blending progresses into the one digital image. The overlap region that overlaps two of the digital images along the seam corresponds to overlapping image content that is captured in both of the digital images. The overlap region is a same number of pixels wide on each side of the seam that is between the digital images. Determining the mismatched color between the digital images along the seam comprises: determining average values of the channel gains in the color space for regions-of-interest within the overlap region for each of the digital images, a region-of-interest encompassing the number of pixels wide by a set of pixels on each side of the seam that is between the digital images; and determining the mismatched color as between the average values for each of the respective regions-of-interest of each of the digital images.

A mobile device, comprising: a camera device to capture digital images that encompass a three-hundred and sixty degree (360°) field of view; an image blending module implemented to combine the digital images along a seam between the digital images to form a blended image, the image blending module configured to: determine mismatched color between the digital images along the seam within an overlap region that overlaps two of the digital images along the seam; and blend the digital images by channel gains in a color space applied to enhance pixels of one of the digital images starting within the overlap region along the seam and blending into the one digital image.

Alternatively or in addition to the above described mobile device, any one or combination of: to determine the mismatched color between the digital images along the seam, the image blending module is configured to: determine average values of the channel gains in the color space for pixel rows within the overlap region for each of the digital images; and determine the mismatched color as between the average values for each of the respective pixel rows of each of the digital images. The image blending module is configured to low-pass filter the average values of the channel gains effective to minimize introducing artifacts into the blended image. The image blending module is configured to determine the average values of the channel gains in YCbCr color space of the digital images. To blend the digital images, the image blending module is configured to taper the blending from a difference value starting along the seam and diminish the difference value as the blending progresses into the one digital image. The image blending module is configured to adaptively taper the blending into the one digital image based on a change in image content as the blending progresses into the one digital image. The overlap region that overlaps two of the digital images along the seam corresponds to overlapping image content that is captured in both of the digital images. The overlap region is a same number of pixels wide on each side of the seam that is between the digital images, and to determine the mismatched color between the digital images along the seam, the image blending module is configured to: determine average values of the channel gains in the color space for regions-of-interest within the overlap region for each of the digital images, a region-of-interest encompassing the number of pixels wide by a set of pixels on each side of the seam that is between the digital images; and determine the mismatched color as between the average values for each of the respective regions-of-interest of each of the digital images.

An image color blending system comprising: memory to maintain digital images that are captured to encompass a three-hundred and sixty degree (360°) field of view; a processor of a computing device to implement an image blending module that combines the digital images along a seam between the digital images to form a blended image, the image blending module configured to: determine average values of channel gains in a color space for pixel rows within an overlap region for each of the digital images, the overlap region overlapping the digital images along the seam between the digital images; determine mismatched color based on the average values of the channel gains in the color space for each of the respective pixel rows of each of the digital images; filter the average values of the channel gains effective to minimize introducing artifacts into the blended image; and blend the digital images by the filtered average values of the channel gains applied to enhance pixels of one of the digital images.

Alternatively or in addition to the above described image color blending system, any one or combination of: to enhance the pixels of the one digital image, the image blending module is configured to apply the filtered average values of the channel gains starting within the overlap region along the seam and blend into the one digital image. The computing device is a mobile phone that includes the memory to maintain the digital images and includes the processor to implement the image blending module, and the mobile phone including a 360-degree field of view camera implemented to capture the digital images.

The invention claimed is:

1. A method, comprising:
   capturing digital images that encompass a three-hundred and sixty degree (360°) field of view;
   combining the digital images along a seam between the digital images to form a blended image, the combining comprising:
      determining average values of channel gains in a color space for regions-of-interest within an overlap region for each of the digital images, a region-of-interest encompassing a number of pixels wide by a set of pixels on each side of the seam that is between the digital images;
      determining mismatched color as between the average values for each of the respective regions-of-interest of each of the digital images along the seam within the overlap region that overlaps two of the digital images along the seam; and
      applying the channel gains in the color space to blend the digital images, the channel gains applied to enhance pixels of one of the digital images starting within the overlap region along the seam and blending into the one digital image.

2. The method as recited in claim 1, wherein said determining the mismatched color as between the digital images along the seam comprises:
   determining average values of the channel gains in the color space for pixel rows within the overlap region for each of the digital images; and
   determining the mismatched color as between the average values for each of the respective pixel rows of each of the digital images.

3. The method as recited in claim 2, further comprising filtering the average values of the channel gains with a low-pass filter effective to minimize introducing artifacts into the blended image.

4. The method as recited in claim 2, wherein the average values of the channel gains are determined in YCbCr color space of the digital images.

5. The method as recited in claim 1, wherein said applying the channel gains in the color space to blend the digital images comprises tapering the blending from a difference value starting along the seam and diminishing the difference value as the blending progresses into the one digital image.

6. The method as recited in claim 5, wherein said tapering the blending into the one digital image is adaptive based on a change in image content as the blending progresses into the one digital image.

7. The method as recited in claim 1, wherein the overlap region that overlaps two of the digital images along the seam corresponds to overlapping image content that is captured in both of the digital images.

8. The method as recited in claim 1, wherein the overlap region is a same number of pixels wide on each side of the seam that is between the digital images.

9. The method as recited in claim 1, wherein the regions-of-interest horizontally subdivide the overlap region.

10. A mobile device, comprising:
    a camera device to capture digital images that encompass a three-hundred and sixty degree (360°) field of view;
    an image blending module implemented to combine the digital images along a seam between the digital images to form a blended image, the image blending module configured to:
       determine average values of channel gains in a color space for regions-of-interest within an overlap region for each of the digital images, a region-ofinterest encompassing a number of pixels wide by a set of pixels on each side of the seam that is between the digital images;

determine mismatched color as between the average values for each of the respective regions-of-interest of each of the digital images along the seam within the overlap region that overlaps two of the digital images along the seam; and blend the digital images by the channel gains in the color space applied to enhance pixels of one of the digital images starting within the overlap region along the seam and blending into the one digital image.

11. The mobile device as recited in claim 10, wherein to determine the mismatched color as between the digital images along the seam, the image blending module is configured to:

determine average values of the channel gains in the color space for pixel rows within the overlap region for each of the digital images; and determine the mismatched color as between the average values for each of the respective pixel rows of each of the digital images.

12. The mobile device as recited in claim 11, wherein the image blending module is configured to low-pass filter the average values of the channel gains effective to minimize introducing artifacts into the blended image.

13. The mobile device as recited in claim 11, wherein the image blending module is configured to determine the average values of the channel gains in YCbCr color space of the digital images.

14. The mobile device as recited in claim 10, wherein to blend the digital images, the image blending module is configured to taper the blending from a difference value starting along the seam and diminish the difference value as the blending progresses into the one digital image.

15. The mobile device as recited in claim 14, wherein the image blending module is configured to adaptively taper the blending into the one digital image based on a change in image content as the blending progresses into the one digital image.

16. The mobile device as recited in claim 10, wherein the overlap region that overlaps two of the digital images along the seam corresponds to overlapping image content that is captured in both of the digital images.

17. The mobile device as recited in claim 10, wherein the overlap region is a same number of pixels wide on each side of the seam that is between the digital images.

18. An image color blending system, comprising:

memory to maintain digital images that are captured to encompass a three-hundred and sixty degree (360°) field of view;

a processor of a computing device to implement an image blending module that combines the digital images along a seam between the digital images to form a blended image, the image blending module configured to:

determine average values of channel gains in a color space for pixel rows within an overlap region for each of the digital images, the pixel rows in regions-of-interest encompassing a number of pixels wide by a set of pixels in the overlap region overlapping the digital images along the seam between the digital images;

determine mismatched color based on as between the average values of the channel gains in the color space for each of the respective pixel rows in the respective regions-of-interest of each of the digital images along the seam within the overlap region that overlaps the digital images;

filter the average values of the channel gains effective to minimize introducing artifacts into the blended image; and blend the digital images by the filtered average values of the channel gains applied to enhance pixels of one of the digital images.

19. The image color blending system as recited in claim 18, wherein to enhance the pixels of the one digital image, the image blending module is configured to apply the filtered average values of the channel gains starting within the overlap region along the seam and blend into the one digital image.

20. The image color blending system as recited in claim 18, wherein the computing device is a mobile phone that includes the memory to maintain the digital images and includes the processor to implement the image blending module, and the mobile phone including a 360-degree field of view camera implemented to capture the digital images.

* * * * *